(12) United States Patent
Johnson et al.

(10) Patent No.: US 7,509,774 B1
(45) Date of Patent: Mar. 31, 2009

(54) APPARATUS FOR INTEGRATING A RIGID STRUCTURE INTO A FLEXIBLE WALL OF AN INFLATABLE STRUCTURE

(75) Inventors: Christopher J. Johnson, Houston, TX (US); Ross M. Patterson, Houston, TX (US); Gary R. Spexarth, Houston, TX (US)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 182 days.

(21) Appl. No.: 11/610,295

(22) Filed: Dec. 13, 2006

(51) Int. Cl.
*E04G 11/04* (2006.01)
*B64G 1/14* (2006.01)
*B64G 1/00* (2006.01)

(52) U.S. Cl. .......................... 52/2.11; 52/2.25; 52/2.14; 244/159.3; 244/159.4; 244/159.5; 244/129.3; 244/31

(58) Field of Classification Search ................. 52/2.11, 52/2.25, 2.14; 244/159.3, 159.4, 159.5, 129.3, 244/31
See application file for complete search history.

(56) References Cited

U.S. PATENT DOCUMENTS

| | | | |
|---|---|---|---|
| 3,276,726 A | 10/1966 | Webb | |
| 3,353,309 A | 11/1967 | Kwake | |
| 3,500,593 A | 3/1970 | Kwake | |
| 3,769,763 A | 11/1973 | Kwake | |
| 3,816,885 A | 6/1974 | Saether | |
| 4,911,380 A | 3/1990 | Regipa | |
| 5,429,851 A | 7/1995 | Sallee | |
| 6,231,010 B1 | 5/2001 | Schneider et al. | |
| 6,439,508 B1 | 8/2002 | Taylor | |
| 6,547,189 B1 * | 4/2003 | Raboin et al. | 244/158.3 |
| 6,899,301 B2 | 5/2005 | Bigelow | |
| 6,938,858 B1 * | 9/2005 | Schneider et al. | 244/158.3 |
| 6,974,109 B1 | 12/2005 | Mezits et al. | |
| 7,295,884 B1 * | 11/2007 | Spexarth et al. | 700/97 |
| 7,389,626 B2 * | 6/2008 | Sperry et al. | 53/403 |
| 2005/0061918 A1 * | 3/2005 | Bigelow | 244/159 |
| 2005/0108950 A1 | 5/2005 | Bigelow et al. | |
| 2005/0120638 A1 * | 6/2005 | Bigelow | 52/2.25 |

\* cited by examiner

*Primary Examiner*—Richard E Chilcot, Jr.
*Assistant Examiner*—Mark R Wendell
(74) *Attorney, Agent, or Firm*—Theodore U. Ro

(57) ABSTRACT

For an inflatable structure having a flexible outer shell or wall structure having a flexible restraint layer comprising interwoven, load-bearing straps, apparatus for integrating one or more substantially rigid members into the flexible shell. For each rigid member, a corresponding opening is formed through the flexible shell for receiving the rigid member. A plurality of connection devices are mounted on the rigid member for receiving respective ones of the load-bearing straps. In one embodiment, the connection devices comprise inner connecting mechanisms and outer connecting mechanisms, the inner and outer connecting mechanisms being mounted on the substantially rigid structure and spaced along a peripheral edge portion of the structure in an interleafed array in which respective outer connecting mechanisms are interposed between adjacent pairs of inner connecting mechanisms, the outer connecting mechanisms projecting outwardly from the peripheral edge portion of the substantially rigid structure beyond the adjacent inner connecting mechanisms to form a staggered array of connecting mechanisms extending along the panel structure edge portion. In one embodiment, the inner and outer connecting mechanisms form part of an integrated, structure rotatably mounted on the rigid member peripheral edge portion.

17 Claims, 10 Drawing Sheets

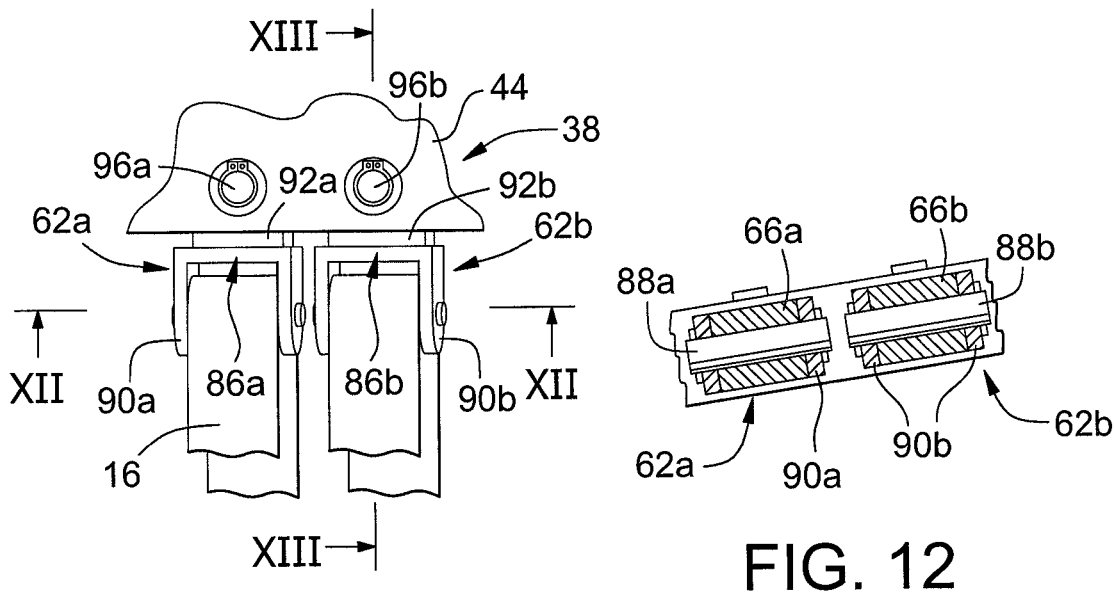
FIG. 11
FIG. 12
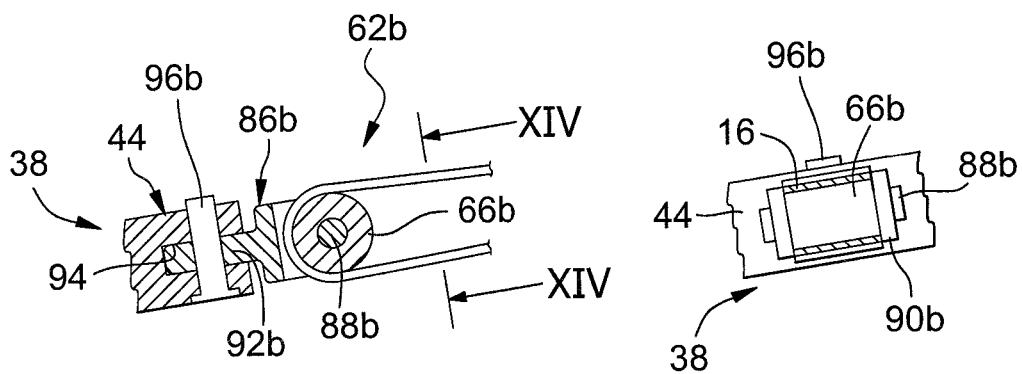
FIG. 13
FIG. 14

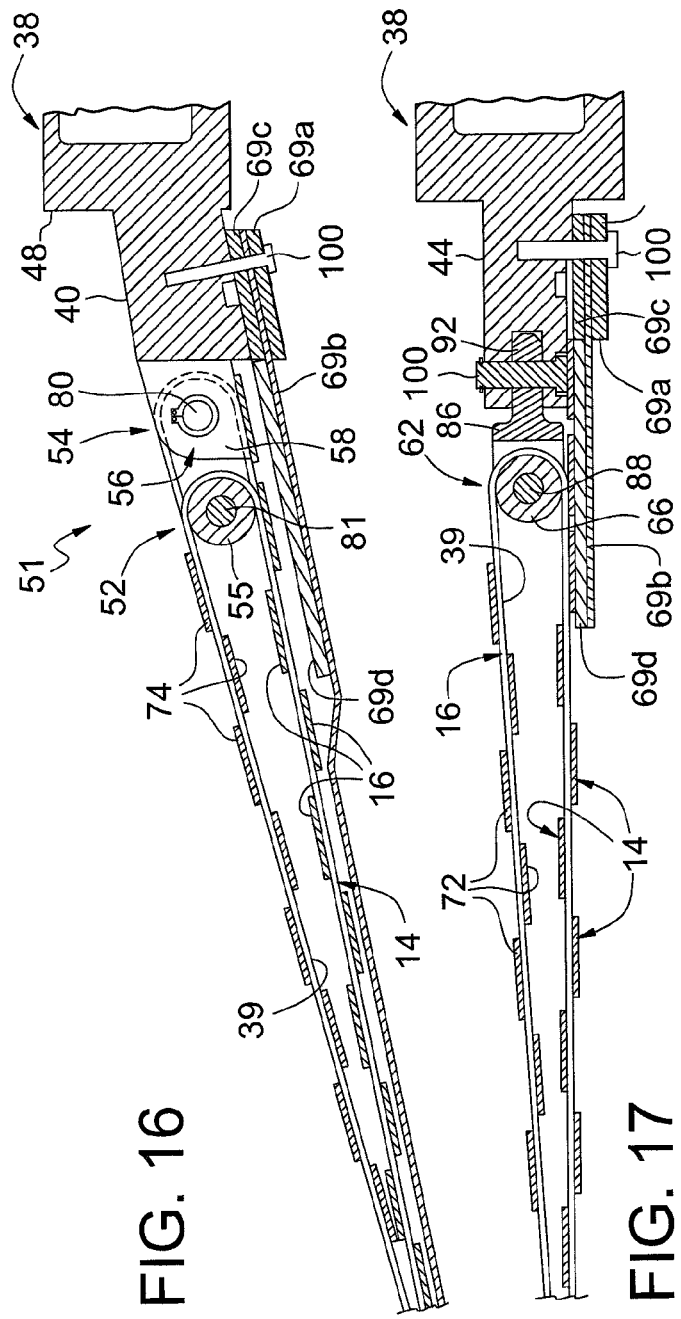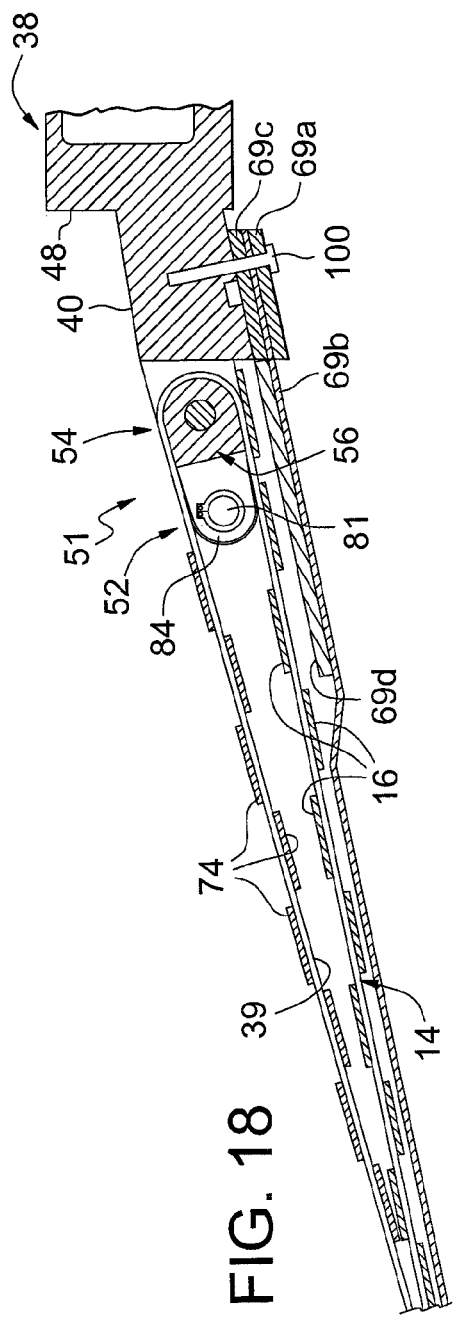

APPARATUS FOR INTEGRATING A RIGID STRUCTURE INTO A FLEXIBLE WALL OF AN INFLATABLE STRUCTURE

ORIGIN OF THE INVENTION

The invention described herein was made by employees of the United States Government and may be manufactured and used by or for the government of the United States of America for governmental purposes without the payment of any royalties thereon or therefore.

FIELD OF THE INVENTION

This invention relates generally to inflatable structures having flexible outer walls and, more particularly, to apparatus and methods for integrating rigid structures, such as panels, bulkheads, window frame assemblies, hatches, and the like, into the flexible outer walls of such inflatable structures.

BACKGROUND OF THE INVENTION

The use of inflatable structures is of interest for applications in which it is desired to provide storage facilities, habitats, laboratories, or the like in remote or isolated locations. Such an inflatable structure may be conveniently transported to a desired location or region in a reduced-volume, non-inflated mode and deployed at the site by inflating the structure, thereby increasing its volume and quickly forming a self-supporting structure. Thus, when it is desired to deploy such a structure in a remote location, or in a region subject to severe environmental conditions, for example, it is advantageous to be able to transport the structure to the desired location in a reduced-volume, non-inflated mode, and to enable its convenient deployment at the remote site. Thus, the time and difficulty entailed in its deployment at the site may be substantially reduced, thereby avoiding prolonged exposure of workers to hazardous conditions during the deployment process.

The use of such an inflatable structure or module is also a means for providing a deployed structure of substantial size and interior volume, substantially greater than that of a conventional, rigid structure of the same mass. As noted, such inflatable structures have been proposed for use as laboratories, human habitats or storage facilities in remote or isolated areas. For example, they are considered advantageous for use as vehicles or modules intended for applications in exoatmospheric space, e.g., vehicles intended for use during orbital or extra-orbital missions, including those intended as habitats on the moon or planets. For such applications, the inflatable structures are launched and placed in orbital or other desired trajectories while in a collapsed, non-inflated mode and then inflated, thereby providing a space module having substantially larger volume than conventional modules of equivalent mass and initial size.

Conventional, non-inflatable or hard-shelled space modules, such as those forming sections of the International Space Station (ISS), have been delivered to the ISS within the cargo bay of the National Aeronautics and Space Administration (NASA) Space Shuttle. In order to minimize the difficulty of tasks required during assembly and deployment of the modules in space, such modules are fabricated and assembled before being loaded into the cargo bay of the Space Shuttle, or other suitable launch vehicle, thereby reducing the complexity of operations required of the astronauts during final assembly and adjustments of the module in space.

Because such conventional space modules have been carried within the cargo bay of the Space Shuttle, their external dimensions must be compatible with the interior dimensions of the cargo bay of the Space Shuttle. Accordingly, their size and configuration have been limited by the internal dimensions and configuration of the Space Shuttle cargo bay. Although sufficient for some applications, larger modules are desirable for other applications, for which the use of inflatable modules is advantageous.

Further advantages of such inflatable modules for space applications include the fact that they are substantially lighter than conventional, "hard shell" modules of equivalent deployed size, due to the fact that such an inflatable module does not require a reinforced, outer metallic skin and associated support structures. A further advantage is the fact that although the diameter of the inflatable module, before deployment, is small, relative to that desired in the deployed vehicle, after deployment the diameter may be substantially larger than that of the outer diameter of the cargo section of the Space Shuttle, or other launch vehicles that may be used, thereby providing a deployed module having a large internal volume suitable for applications such as orbital laboratories, habitats, storage modules, etc. Publications relating to the design of such inflatable space modules include U.S. Pat. Nos. 6,974,109 and 6,938,858; United States Patent Application Publication No. US 2005/0108950 A1, published May 26, 2005, and U.S. Pat. Nos. 6,231,010 and 6,547,189. The construction of such space modules is disclosed in detail in U.S. Pat. Nos. 6,231,010 and 6,547,189, both of which are hereby incorporated by reference.

Whereas such inflatable structures have utility in a variety of applications and environments, their construction entails design considerations not typically experienced in the construction of conventional buildings, storage structures, rigid space modules, and the like. This is particularly the case with respect to space applications, wherein safety considerations are paramount, and wherein human lives are dependent upon the structural integrity and reliability of such structures. For example, such design considerations include factors relating to the integration of rigid panels, bulkheads, hatches, window frame assemblies, and the like into the flexible outer walls of such modules. As disclosed in the U.S. Pat. Nos. 6,231,010 and 6,547,189 patents, the flexible outer walls of such inflatable space structures are complex structures incorporating multiple layers formed of materials selected to perform respective functions. For example, and starting with the innermost layer and progressing outwardly, such flexible outer wall structures may include: an inner protective liner; at least one bladder of a gas-impermeable material; a structural restraint layer; a meteoroid orbital debris (M/MOD) shield assembly, and an outer protective layer. Structural loads resulting from the inflation of the inflatable module are born by the restraint layer, which may be a webbing comprising multiple, orthogonal strips of high tensile strength material such as Kevlar® or Vectran®.

As disclosed in the '010 and '189 patents previously incorporated by reference, inflatable structures or modules adapted for use in exoatmospheric space, in some applications, have been of elongated, cylindrical configuration. In such embodiments, they may include a longitudinally extending, rigid central core or truss assembly around which the flexible shell or outer wall structure is formed. Upon being inflated by the introduction of gas under pressure during deployment, the module expands, and the flexible wall structure is thus stretched outwardly into an elongated, substantially cylindrical shape, the elongated central core extending longitudinally and coaxially along the length of the inflatable structure. As also disclosed in the referenced '010 and '189 patents, in one embodiment, end portions of the flexible wall structure are attached to respective end portions of the longitudinal core and, when deployed, form partially hemispherical end portions. As will be understood by those in the art, when inflated, the flexible wall structure is subject to tensional forces caused by the increased interior pressure, i.e., the differential pressure between that of the interior volume of the structure and the external environment, which in the case of a vehicle in space is a substantially perfect vacuum.

Tensional forces exerted on the flexible wall structure are largely sustained by the restraint layer, which in some embodiments comprises a webbing formed of interwoven straps. After deployment, pressures within an inflated module intended for use as a human habitat are typically in the range of approximately 8 to 15 pounds per square inch. Because such space modules, in their deployed, inflated mode, may be of substantial diameter, the tensional forces on the restraint layer may also be substantial, particularly forces exerted circumferentially of cylindrical portions of such modules. As will be understood by those in the art, the longitudinal forces, i.e., the forces exerted along the longitudinal axis of the module may be partially sustained by the rigid interior core and are generally less than the circumferential forces sustained by circumferentially extending straps.

Whereas the construction of such inflatable modules has been the subject of extensive development, complications exist with respect to certain design features. As previously stated, this is particularly the case with respect to the integration of rigid elements, such as bulkheads, panels, hatches, window assemblies, and the like, into the flexible wall structure. For example, if such a module is intended for use as a work area, laboratory, or habitat, it is often desirable to provide windows, doors, or the like in the module flexible wall structure. The provision of windows is of interest with respect to inflatable modules such as laboratories, human habitats, or the like intended for use in exoatmospheric space, particularly those that will be occupied for extended periods of time. In addition to the obvious human factors, the ability to view structures external of the module may be of importance during docking maneuvers, safety inspections, and the like.

However, the integration of mounting of a rigid structure in the flexible wall structure of such an inflatable module presents unique challenges to the designer. For example, if one or more window frame assemblies are to be integrated within such a flexible wall structure to permit visual observations through the windows, it is necessary, at each window, to form openings or "structural pass throughs" through the portions of the flexible wall structure in register with the window frame assembly. Thus, openings must be formed through the bladder, the inner and outer protective layers, and the flexible restraint layer, among others. To prevent the escape of gas under pressure from the interior of the module through such an opening, means must be provided for sealingly attaching the bladder to the periphery of the window frame. With respect to the restraint layer, each of the longitudinal and circumferential straps adjacent an opening, e.g., each of the orthogonally arrayed straps that intersect the window frame assembly must be terminated to form the opening in which the window frame assembly will be mounted. As will be discussed below, loops are preferably formed in the end portions of the straps adjacent the window frame assembly for facilitating their connection to the rigid window frame or panel, as described in the referenced '189 and '010 patents and as will be discussed further below.

For ensuring the physical integrity of the module, provisions must be made for securely attaching the looped end portions of the straps to portions of the window frame such that tension occurring as the module is inflated can be retained on all the straps, including those terminated at the windows, applying tensional loads on the straps as required both for maintaining a desired configuration and configuration of the module when inflated and for maintaining its structural integrity. Additionally, it is desirable to evenly distribute such loads and to prevent binding of the straps during movement and flexure of the flexible wall structure. As disclosed in the '189 and '610'patents, the end portions of the straps are advantageously looped around rollers rotatably supported by devises or the like mounted along the periphery of the window frames, whereby tensions on the upper and lower portions of the strap loops are substantially equalized, and whereby the straps may exert tension on the window frame from different directions without binding at their connection to the frame, and whereby tensional forces on the straps may be substantially equalized and consistently applied to the window frame.

The use of such structural pass-through panels, such as window frames, having rollers supported by devises adjacent the peripheral edges of the panel through which end portions of respective webbing straps are looped, and wherein circumferentially extending straps are interwoven with the longitudinal straps, is disclosed, for example, in the '189 patent. Also disclosed in the '189 patent are means for sealingly attaching the bladder of such an inflatable module to peripheral portions of rigid panels, window frames, or the like for preventing leakage of air from the interior of an inflated module around the frame and through the opening.

Further issues of concern with respect to the integration and interaction of the rigid and flexible components include the necessity of preventing damage to flexible layers, such as the bladder, restraint layer, and protective backing materials, as the module is unfolded and expanded during its inflation and deployment. Also, both during and after deployment, differential stresses and different reaction to stresses by rigid and flexible components are of concern and could result in undesirable degrees of strain on the flexible components if not properly compensated for and distributed. For example, and as will be understood by those in the art, tensional forces exerted on the flexible straps can result in a degree of elongation or stretching of the straps, whereas the same forces exerted on a rigid panel produce substantially no deformation of the panel. Thus, and as will be more fully understood from the disclosure to follow, means must be provided for reducing potentially deleterious, differential stresses on the respective flexible straps, for ensuring that such forces are evenly distributed, and for accommodating differing reactions to stress of the rigid and flexible components.

As will be understood from the description to follow, advantageous features of the present invention include the use of mechanisms for connecting circumferential and longitudinal webbing straps to one or more rigid panel members, such as window frames, such that tensional loads are equally distributed thereon and such that the loads on the straps are parallel to the major axes of the panel, so that bending moments on the panel and on elements mounted on the panel are reduced. As will be understood from the disclosure to follow, in preferred embodiments of the present invention, such non-axial forces are eliminated or substantially reduced.

Connecting mechanisms for connecting respective load bearing straps to such rigid panel structures, in some applications, have comprised attachment mechanisms affixed to the panels and mutually spaced along the edges of such panels, whereby the load-bearing straps supported by respective connecting mechanisms are maintained in mutually spaced, mutually parallel configuration. This spacing between adjacent straps has, in the past, been necessary because the connecting mechanisms, typically including clevis structures and rollers, are wider than the respective straps and are mutually spaced along the panel edge portions. As will be understood from the present disclosure, in mechanisms constructed in accordance with embodiments of the present invention, the mutually parallel straps connected to edge portions of such a rigid panel may be substantially contiguous to one another rather than being mutually spaced. This permits the use of a greater number of connecting means, and thus, a greater number of straps per unit of length along a given panel edge portion, thus distributing the loads through a greater numbers of straps than would be otherwise permitted and thereby reducing the loads sustained by the individual straps.

Another complication entailed in the integration of rigid structures into the flexible outer walls of such inflatable structures relates to the fact that, as previously noted, circumferentially directioned forces sustained by the cylindrical wall portion of a module after inflation are normally greater than those sustained in the longitudinal direction. As will be understood from the disclosure to follow, complications from such an effect are substantially alleviated in embodiments of the present invention. As previously suggested, a further complication relative to such inflatable structures which is addressed herein relates to the fact that, as pressure increases within the module during deployment, the flexible straps tend to stretch and elongate as they sustain their respective tensional loads. However, there is relatively little deformation or elongation of the rigid structures. Thus, elongation of the inflatable and rigid structures can differ, creating an uneven load distribution around the panel structure. If unaddressed, this fairly local effect could overload the inflatable shell and/or frame in that region.

With reference to the disclosure, although the embodiments illustrated in the accompanying drawings and described in detail herein relate primarily to applications of inflatable modules in exoatmospheric space, it should be understood that the invention is not limited to such applications and also has utility in various terrestrial and marine applications, particularly those in which it is desired to provide enclosed storage or habitat facilities at a remote location or under severe weather conditions, and in which it is desired to transport the facilities to such locations in a compact mode and to deploy them quickly and conveniently at the desired site.

Thus, the present invention provides structure for forming an improved interface between rigid and flexible components in an inflatable structure having a flexible outer shell or wall. In particular, the present invention resolves problems relating to the mounting of rigid panels, such as window frame structures, in the flexible walls of such inflatable structures and is adapted for reliable operation for extended periods in severe environments. The design and construction of the present invention and such inflatable structures, and the nature of the forces acting upon their various components, will be more fully understood and appreciated from the detailed disclosure to follow.

BRIEF SUMMARY OF THE INVENTION

For an inflatable structure having a flexible wall structure, a rigid member adapted to be integrated into the flexible wall structure, the flexible wall structure having a restraint layer comprising flexible, load-bearing straps. The rigid member has a plurality of connecting means for receiving end portions of respective ones of the load-bearing straps, the connecting means being configured and arrayed to connect the straps to the rigid member such that tensional loads on the straps are distributed between the straps and such that adjacent straps are attached to portions of the rigid member in mutually parallel and substantially contiguous alignment. In one embodiment, the rigid member is a panel structure having a curvature corresponding to that of the flexible wall structure of an inflatable module when the module is in an inflated, deployed mode. In one embodiment, the panel structure is a frame having an opening receiving a window. In one embodiment, a plurality of connecting means are mounted on at least one peripheral edge portion of the rigid panel, the connecting means comprising a plurality of outer connecting mechanisms and a plurality of inner connecting mechanisms, the respective outer connecting mechanisms being spaced along the panel peripheral edge portion between adjacent pairs of inner connecting mechanisms whereby alternate connecting mechanisms comprise outer connecting mechanism, the outer mechanisms projecting outwardly from the panel structure edge portion beyond adjacent inner connecting mechanisms to form a staggered array of connecting mechanisms along the panel structure edge portion.

BRIEF DESCRIPTION OF THE DRAWINGS

FIG. 11 is a fragmentary top plan view of the portion of the panel structure identified by broken line XI of FIG. 5 showing the contiguous connecting mechanisms;

FIG. 12 is a cross-sectional view taken as on line XII-XII of FIG. 11;

FIG. 13 is a sectional view taken as on line XIII-XIII of FIG. 11;

FIG. 14 is a cross-sectional view taken as on line XIV-XIV of FIG. 13, showing the clevis and roller mechanism of an embodiment of the contiguous connecting mechanisms;

FIG. 16 is an enlarged cross-sectional view of an embodiment of the connecting means and associated components taken as on a portion of line XVI-XVI of FIG. 5;

FIG. 17 is an enlarged cross-sectional view of another embodiment of the connecting means, and associated components, taken as on line XVII-XVII of FIG. 5;

FIG. 18 is an enlarged cross-sectional view of the embodiment of the connecting means and associated components shown in FIG. 16, taken as on line XVIII-XVIII of FIG. 5.

DETAILED DESCRIPTION OF EMBODIMENTS OF THE INVENTION

Figure 1:
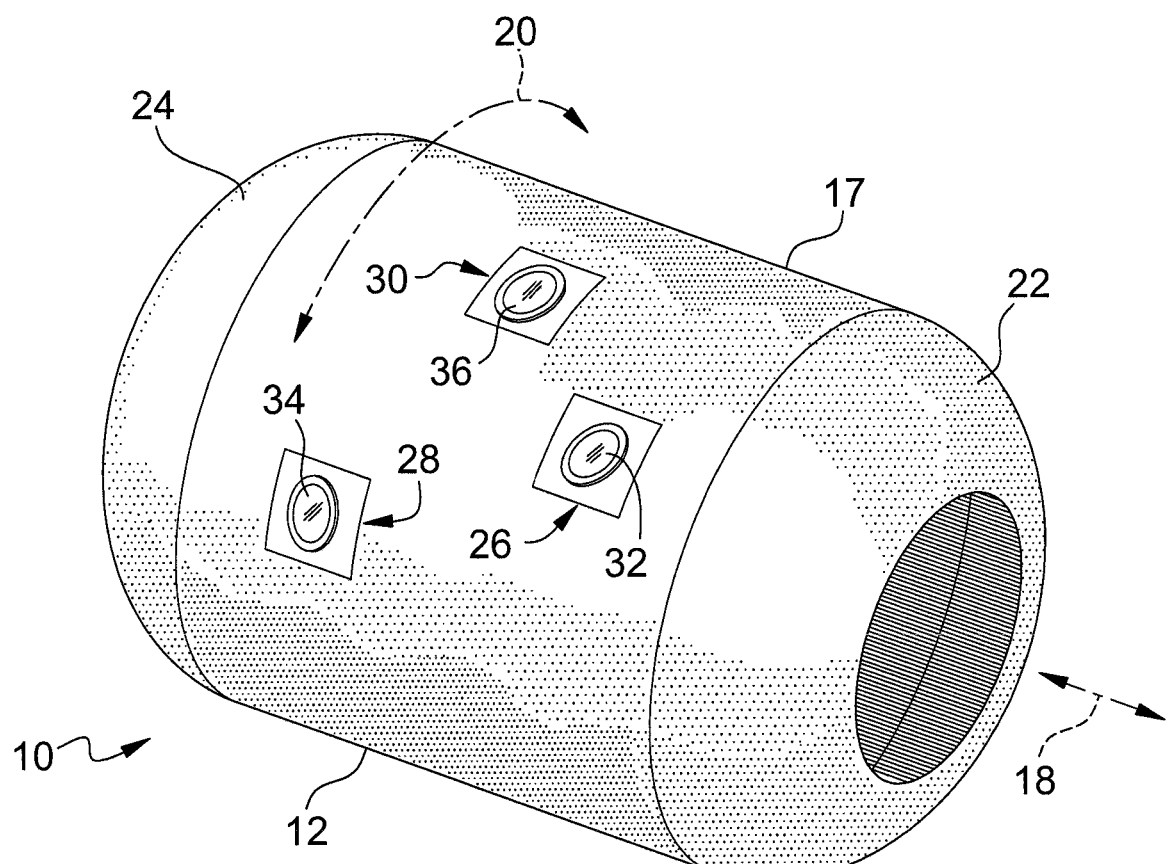
FIG. 1 is a partially diagrammatic, isometric representation of an inflatable space module with its outer protective layer and other components omitted for clarity and showing the flexible restraint layer and three rigid panels, each having a window frame assembly mounted therein.

Embodiments of the invention will now be described with reference to the drawing. As previously noted, the embodiments illustrated and described in the present disclosure relate to applications of the invention in inflatable modules adapted for deployment in exoatmospheric space. It should be understood, however, that other applications and embodiments are also within the scope of the invention, which is defined by the accompanying claims. As previously noted, the construction of such inflatable space modules is disclosed in issued patents such as U.S. Pat. Nos. 6,231,010 and 6,547,189, both of which have been incorporated by reference. Accordingly, reference is made to the '010 and '189 patents for a detailed disclosure of the construction of such inflatable modules.

With initial reference to FIG. 1, an inflatable module 10, with its M/MOD shielding and other components omitted for clarity, includes a restraint layer 12. The restraint layer 12 and module 10 are represented as they would be configured in the module's fully inflated, deployed mode. As disclosed in the '010 and '189 patents, the restraint layer 12 constitutes one of the layers of the flexible outer wall structure or shell, not shown, of the module 10, the flexible outer shell being disclosed in the '189 and '010 patents.

Figure 3:
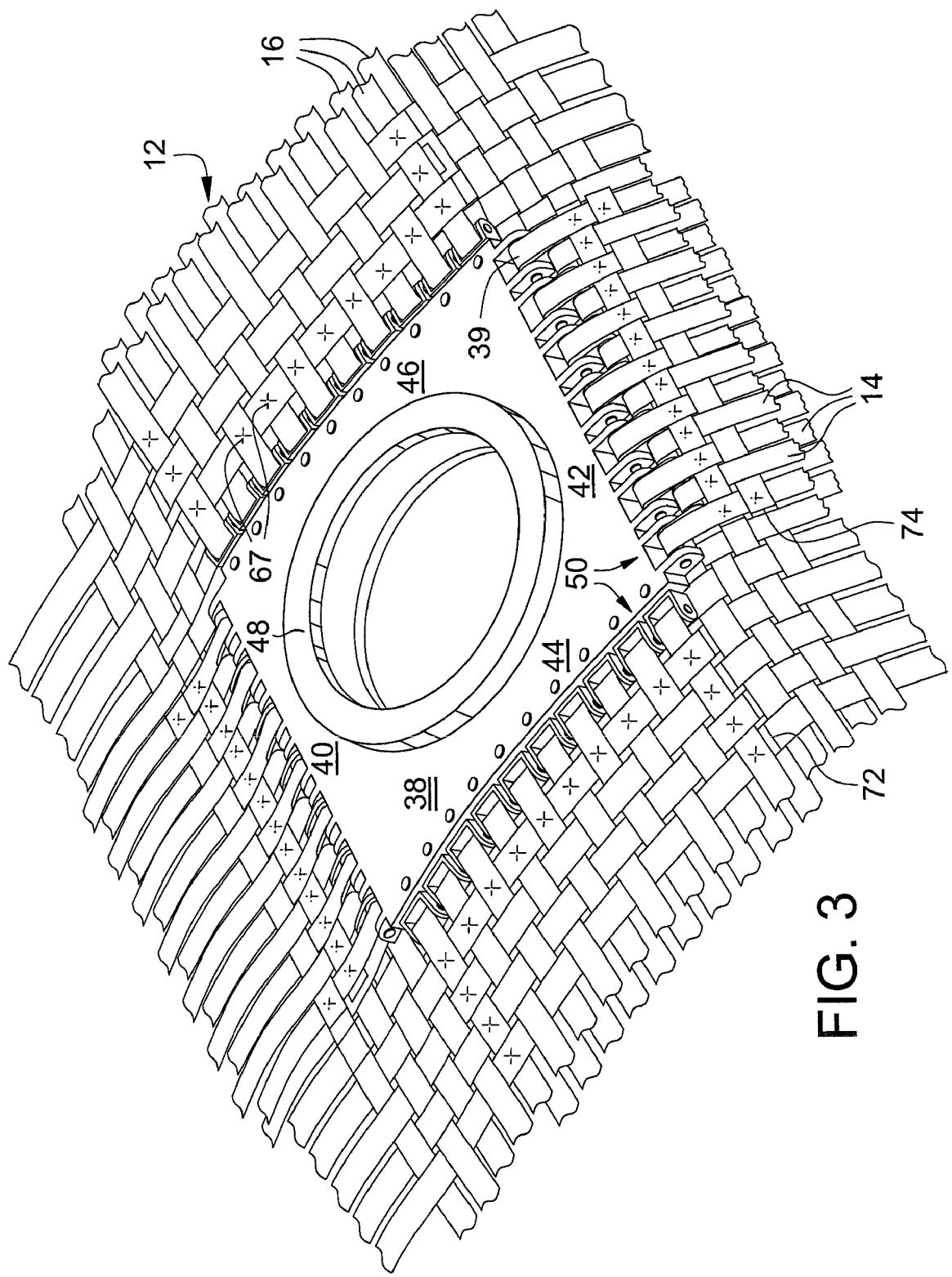
FIG. 3 is a perspective view of one of the rigid panels as viewed from outside the module, showing portions of the circumferential and longitudinal fabric straps of a module restraint layer.
Figure 4:
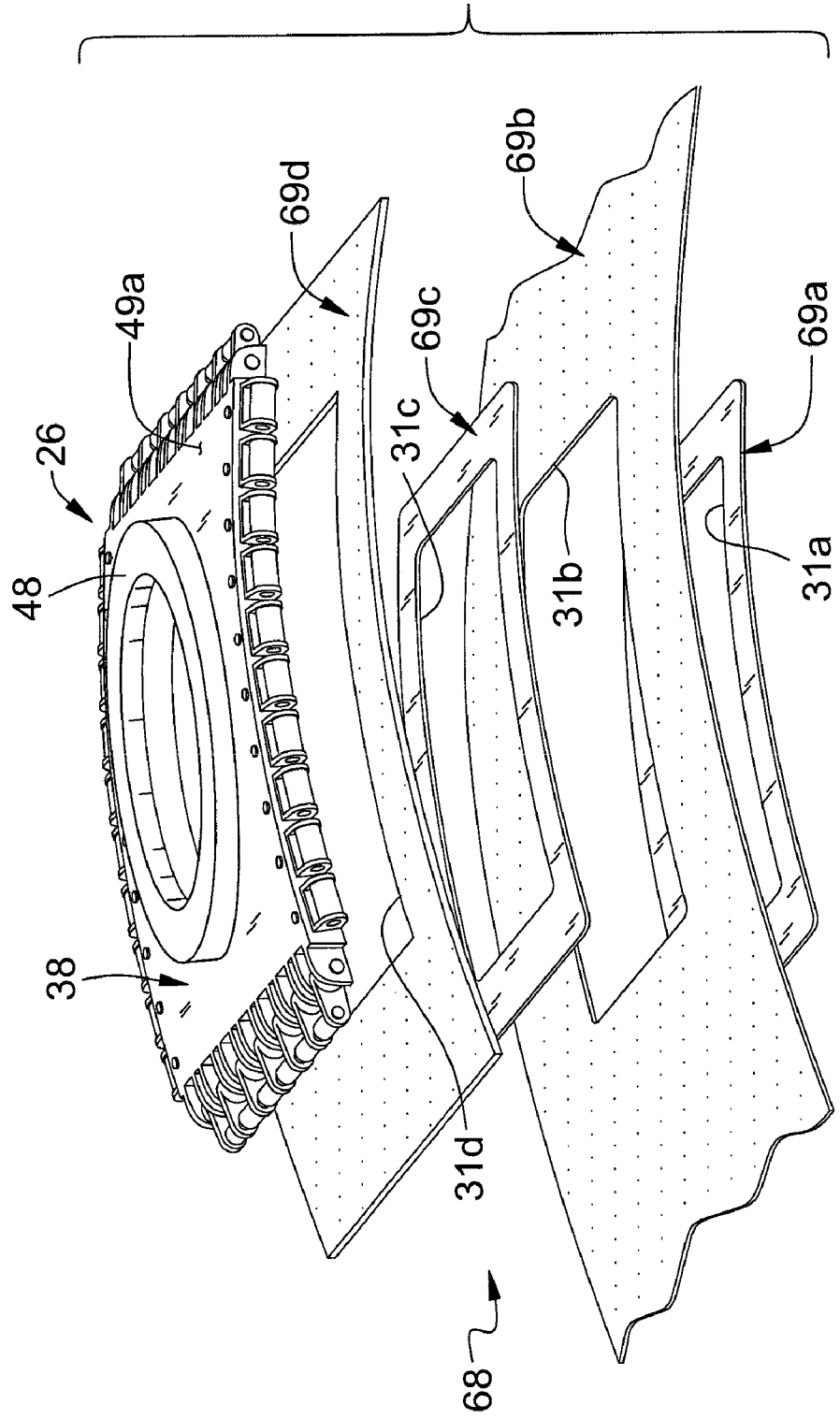
FIG. 4 is an exploded, isometric representation of the panel structure of FIGS. 2A, 2B, and 3 showing several components extending alongside the inner side of the panel structure.

The restraint layer 12 serves to physically constrain the module 10 and prevent it from expanding outwardly beyond its design configuration. It further serves to prevent outward deformation of the bladder 69b (FIG. 4). As disclosed in the '189 and '010 patents, the restraint layer 12 is preferably in the form of a webbing formed of interwoven, flexible, load-bearing straps orthogonally arrayed, including a plurality of circumferentially extending, load-bearing straps 14 (seen more clearly in FIGS. 3 and 5) and a plurality of longitudinal reinforcing straps 16 (FIGS. 3, and 5), interwoven with the circumferential straps 14. As seen most clearly in FIG. 3, the longitudinal straps 16 are arrayed in mutually parallel alignment. In the present embodiment, the module 10 includes an elongated, cylindrical body portion 17 (FIG. 1), and the longitudinal straps 16 thus extend longitudinally of the module cylindrical body portion 17, or generally parallel to the module longitudinal axis 18. The circumferential straps 14 (FIGS. 3, 5) are also arrayed in mutually parallel alignment and extend circumferentially of the module cylindrical body portion 17 as indicated at line 20 (FIG. 1). As known to those in the art, such reinforcing straps 14 and 16 may be of various forms appropriate to particular applications. As previously discussed, they are advantageously woven strips of high-tensile strength material such as Kevlar® or Vectran®.

As also disclosed in the '010 and '189 patents and as previously discussed, in some applications, inflatable space structures such as module 10 include a rigid, central core or truss assembly, not shown, extending longitudinally and coaxially of the module cylindrical body portion 17. The central core serves to provide structural support and longitudinal rigidity to the module 10. End portions 22 and 24 (FIG. 1) of the restraint layer 12 are connected to the end portions of the central core, not shown. Longitudinal straps 16 are thus suitably connected to opposite end portions of the central core. In the present, illustrative embodiment, in its inflated mode, the module's end portions 22, 24 are of hemispherical configuration, as seen in FIG. 1. In other embodiments they may be of semi-toroidal configuration. During inflation, the flexible restraint layer 12 is urged outwardly by the positive pressure within the bladder 69b (FIG. 4), which itself is constrained by the restraint layer 12.

With continued reference to FIG. 1, in the illustrated embodiment, the module 10 includes first, second, and third window frame assemblies 26, 28, and 30 mounted in the module flexible outer shell, portions of which are seen at 68 (FIG. 4). Window frame assemblies 26, 28, and 30 are mounted in and supported by portions of the restraint layer 12, FIG. 1, and connected at their peripheral edge portions to the straps 14, 16, as will be shown and described in detail hereinbelow. With respect to the first window frame assembly 26 as typical of the three window frame assemblies 26, 28, and 30, its association with and connection to straps 14 and 16 may be seen in FIGS. 3 and 5. As will also be more fully understood from the description to follow, the window frame assemblies 26, 28, and 30 are received within respective openings, not shown, formed through the restraint layer 12. Each of the window frame assemblies 26, 28, 30 includes structure (not shown) for receiving a transparent window assembly 32, 34, 36 (FIG. 1).

Figure 2:
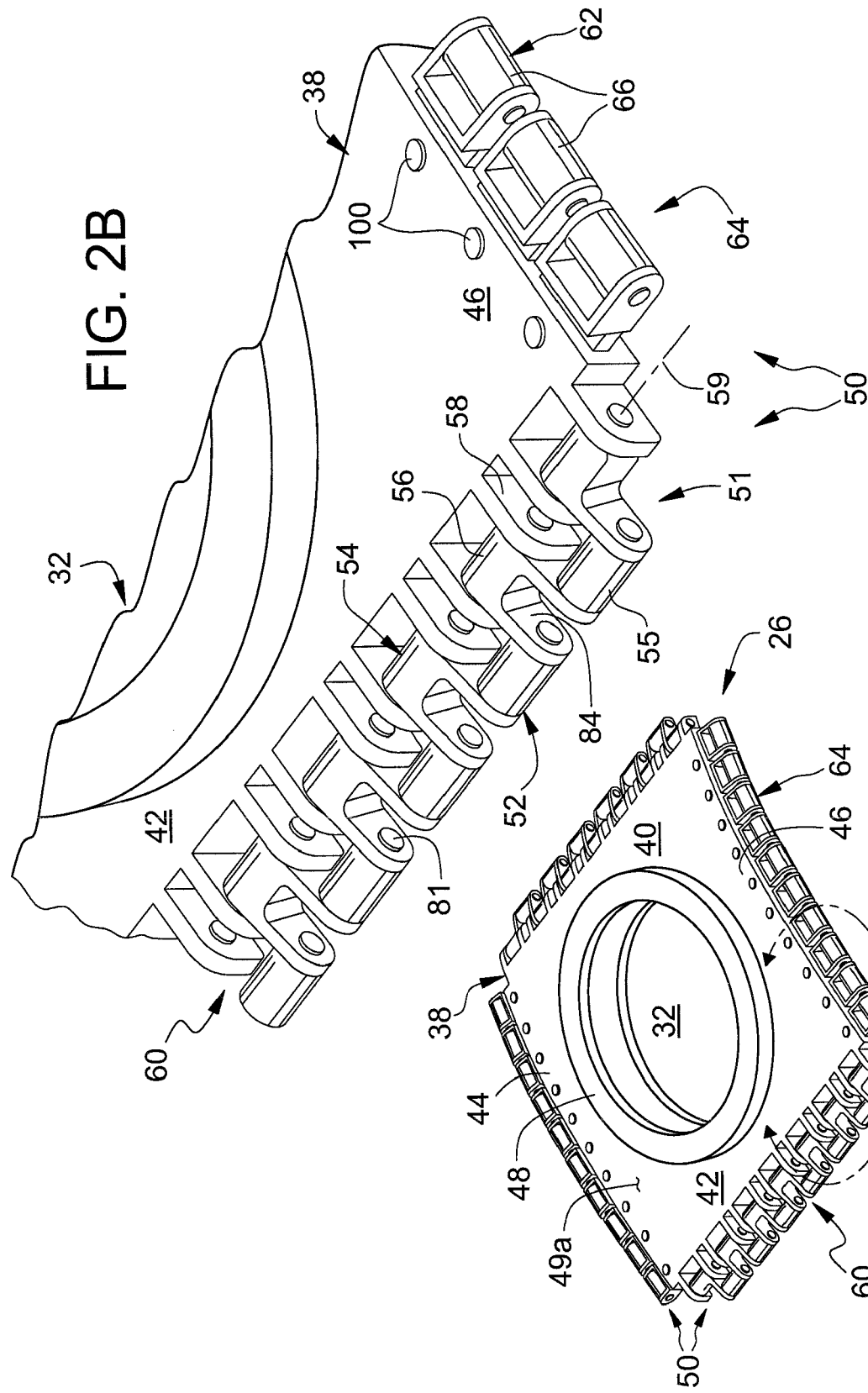
FIG. 2A is an isometric view of one of the three panel structures as viewed from outside the inflated space module.
FIG. 2B is an enlarged, isometric, view, indicated by broken line IIB in FIG. 2A, of a portion of the panel structure of FIG. 2A and showing a first embodiment of the staggered array of connecting mechanisms.

With respect to the first window frame assembly 26 as typical, and with primary reference now to FIG. 2A, window frame assembly 26 includes a panel structure or window frame 38, of rectangular configuration in plan. The elongated or oval window assembly 32, in the present embodiment, is oriented such that it extends lengthwise of the rectangular window frame 38, or along the module circumferential axis 20 (FIG. 1). As known in the art, window frame assemblies adapted for use in space vehicles suitably include multiple, mutually spaced panes of transparent material such as glass or plastic material, not shown.

The rectangular rigid panel or window frame 38 is received and supported within a corresponding rectangular opening, not shown, formed through the restraint layer 12 such that the frame is contiguous with the adjacent portions of the restraint layer. With reference to FIG. 3, the circumferential and longitudinal straps 14, 16 that intersect the frame 38 are thus terminated adjacent the frame to form the rectangular opening in which the frame is supported, the end portions of the intersecting straps 14, 16 being folded back to form loops 39, seen more clearly in FIG. 6, in the respective end portions of the straps at their juncture with frame 38. The construction and application of such looped end portions 39 for facilitating the connection of load-bearing straps, such as straps 14 and 16, to rigid structures such as frame 38 is disclosed in the '189 and '010 patents, previously incorporated by reference, and will not be described in detail herein. The opening formed through the restraint layer 12 (FIG. 1) thus corresponds substantially in configuration to the external configuration of the window frame assembly 38. Additionally, the window frame 38, in side elevation (FIG. 6), corresponds with and continues the semi-cylindrical configuration of the cylindrical restraint layer body portion 17 (FIG. 1), for reasons that will become apparent from the description to follow. Thus, the panel structure or window frame 38 is contiguous with those straps 14, 16 that intersect the frame, and loops 39 are formed in the end portions of the intersecting straps adjacent the frame for facilitating the connection of the straps to the frame, as described more fully below with reference to FIGS. 5-18.

The construction of the window frame assemblies 26, 28, and 30 (FIG. 1) and their integration into the restraint layer 12 will now be described in greater detail. Whereas, for illustrative purposes, the present embodiment has three rigid structures (three window frame assemblies 26, 28, and 30, FIG. 1), it should be understood that in other embodiments a greater or lesser number of such rigid structures may be employed. As seen in FIG. 1, in the illustrated embodiment, the window frame assemblies 26, 28, 30 are not aligned with one another along either the longitudinal or circumferential axes 18, 20. More specifically, they are positioned in a mutually offset array such that none of them is in longitudinal or circumferential alignment with another. Thus, none of the circumferential and longitudinal straps 14, 16 of the restraint layer 12 intersect more than one of the window frame assemblies. Such an arrangement avoids the requirement of making multiple, successive breaks in the straps 14, 16. In other embodiments, particularly larger modules, they may be longitudinally and/or circumferentially aligned.

First window frame assembly 26, FIG. 1, substantially identical to the other window frame assemblies 28, 30, will be described herein as typical and representative of the other two. With additional reference to FIG. 2A, in which straps 14, 16 are omitted for clarity, rigid, rectangular panel structure or window frame 38 of window frame assembly 26 has first and second end portions 40, 42 and first and second side portions 44, 46. As viewed in FIG. 2A, the first and second end portions 40, 42 form the upper and lower edge portions of the window frame 38, and the first and second side portions 44, 46 form the left and right edge portions, respectively, of the window frame 38.

In the present embodiment, window seat 48, of oval configuration, extends lengthwise of the window frame assembly 26. As previously noted, windows such as windows 32 (FIG. 1) employed in space vehicles typically comprise multiple window panes for safety and for minimizing fogging of the window panes. The construction of such multi-pane windows is known in the art and will not be described in detail herein. With reference to FIGS. 2A and 4 and with primary reference to FIG. 6, the rectangular window frame 38 is curved along its length in a semi-cylindrical configuration such that its outer surface 49a is convexly. The first and second end portions 40 and 42 of the frame 39 extend linearly, parallel to the longitudinal straps 16 and the longitudinal axis 18. Thus, the contour of the window frame assemblies 26, 28, 30 (FIG. 1) is substantially identical to that of the of the restraint layer 12 (FIG. 1) when the module 10 is fully deployed, thereby continuing the restraint layer's internal contour along both the circumferential and longitudinal axes and permitting the window frame assemblies to nest within and mate with corresponding openings formed through the restraint layer 12. As will be more fully understood from the discussion below, the semi-cylindrical configuration of the window frame assemblies 26, 28, 30 reduces differential and torsional loads on the window frame assemblies.

Figure 5:
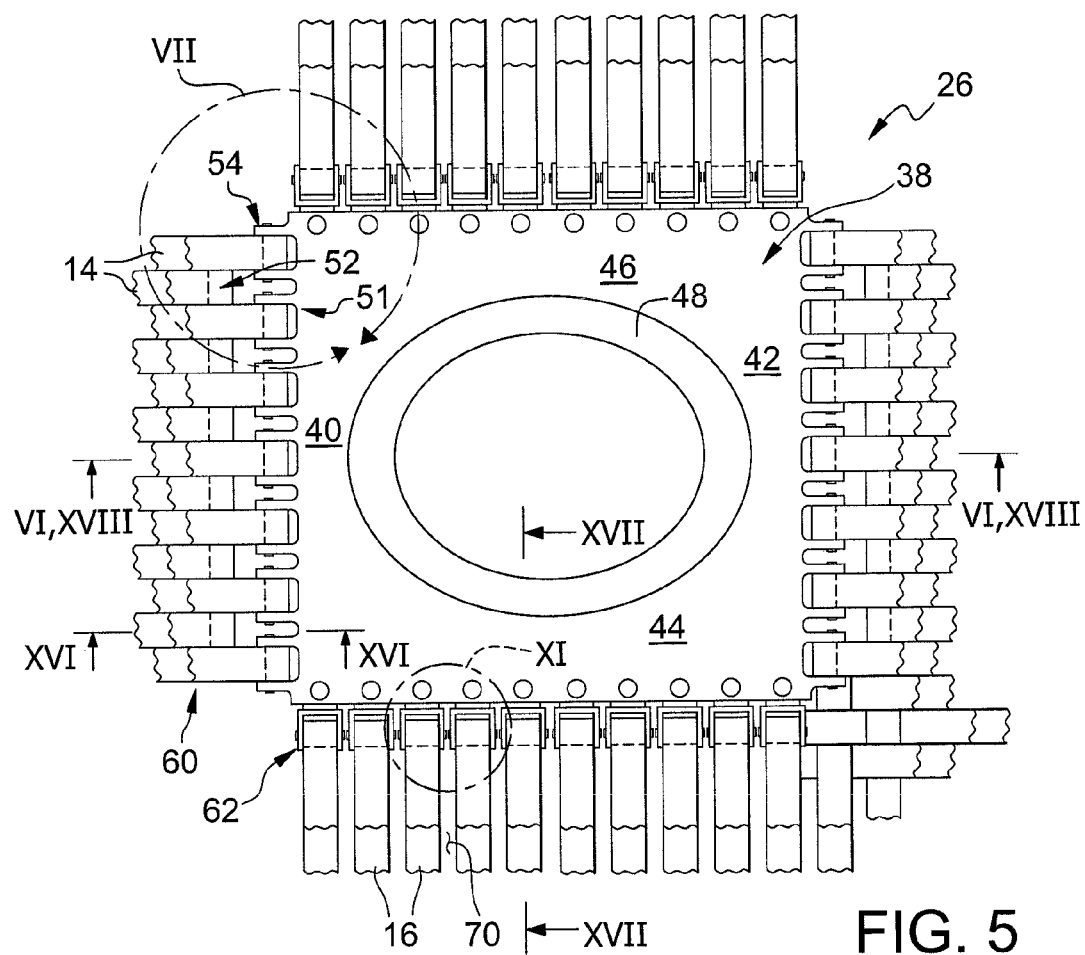
FIG. 5 is a plan view of the panel structure of FIGS. 2A, 2B, 3, and 4 viewed as from outside the module, showing portions of the restraint layer straps connected thereto.
Figure 6:
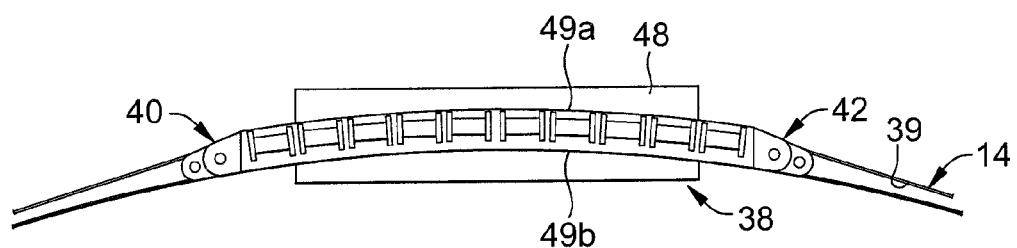
FIG. 6 is a side view of the panel and circumferentially extending straps of FIG. 5 taken as on line VI, XVIII-VI, XVIII of FIG. 5.

As seen in FIG. 6, the oval window seat 48 is of rectangular configuration as viewed laterally. As previously noted, the circumferential straps 14 (FIGS. 3, 5, and 6) extend circumferentially around the module body portion 17, as diagrammatically represented at line 20, FIG. 1. More specifically, those circumferential straps 14 that intersect one of the window frames 38, 28, or 30 terminate at the first and second end portions 40, 42 of the respective frame.

With continued reference to FIG. 2A, a plurality of connecting means 50 are mounted on the window frame 38 for receiving respective ones of the load-bearing straps 14, 16 (FIGS. 3, 5) and connecting them to the frame 38. The connecting means 50 mounted on end portions 40 and 42 of frame 38 form a staggered array 60 of connecting mechanisms, as will be more fully described in the sections to follow. With additional reference to FIG. 2B, in which straps 14, 16 are also omitted for clarity, and with respect to the staggered array 60 of connecting means 50 mounted on frame end portions 40 and 42, an integrated assembly 51 of outer and inner connecting mechanisms 52, 54 is rotatably mounted on the frame end portion 42 (FIG. 2B). Each outer connecting mechanism 52 includes an outer roller structure 55, and each inner connecting mechanism 54 includes an inner roller structure 56, roller structures 55 and 56 each being adapted to receive the looped end portion 39 (FIG. 6) of a respective one of the circumferential straps 14. As more fully described below, the integrated assembly 51 of outer and inner roller structures 52, 54 is rotatably supported by lugs 58 projecting outwardly from frame end portion 42 and rotatable about axis 59. Thus, the inner and outer connecting mechanisms 54, 52 are mounted on the adjacent second end portion 42 of the frame 38, the respective outer connecting mechanisms 52 being positioned between adjacent pairs of inner connecting mechanisms 54, wherein the connecting mechanisms arrayed alongside window frame end portion 40 alternate between interleaved, outer and inner connecting mechanisms 52, 54. In the present embodiment, the outer connecting mechanisms 52 project outwardly from the adjacent edge portion 42 of frame 38 beyond the adjacent inner connecting mechanisms 54, the inner connecting mechanisms 54 being spaced inwardly from, and positioned between, the adjacent outer connecting mechanisms 52 and the panel end portion 42, thereby forming the staggered array 60 of connecting mechanisms extending along the frame end portion 42. A similar, staggered array of connecting mechanisms is mounted on the frame first end portion 40, as seen in FIGS. 2A and 5.

The construction and functions of the two types of connecting mechanisms, that is, outer connecting mechanisms 52 and inner, contiguous connecting mechanisms 54 will be more fully understood from the description to follow, particularly those sections including reference to FIGS. 5-15, 17, 18, and 19. It should be noted initially that the connecting mechanisms 52, 54, arrayed in staggered array 60, are particularly adapted to receive the end portions of circumferential straps 14, as seen in FIGS. 3 and 5, for reasons to be discussed more fully hereinbelow. As previously noted, in modules such as that of the present embodiment, the tensile forces sustained by the respective circumferential straps 14 are usually greater than those sustained by the longitudinal straps 16, and, for reasons that will become apparent from the description to follow, the staggered arrays 60 of connecting mechanisms 52, 54 are particularly suited for receiving and distributing such circumferential loads.

With continued reference to FIGS. 2A and 2B, it will be seen that, in the present embodiment, the connecting means mounted on the frame side portions 44, 46 are of a configuration differing from that of those just described, mounted on the end portions 40, 42. With primary reference to FIG. 2B, a plurality of contiguous connecting mechanisms 62 are mounted on side edge portion 46 of frame 38, the contiguous connecting mechanisms being mutually spaced along the frame side edge portion 46 in a linear, non-staggered, contiguous array 64. Thus, the contiguous connecting mechanisms 62 are contiguous with the side edge portion 46 of the frame 38. Each contiguous connecting mechanism 62 includes a roller 66, the rollers 66 being rotatable about their axes, which are spaced outwardly from and aligned generally parallel to the side portion 46 of the frame 38. In the present embodiment, the rollers 66 of the contiguous connecting mechanisms 62 are thus coaxially aligned, positioned in mutually spaced, side-by-side array along the frame side portion 46, and rotatable about a common axis extending generally parallel to the frame side portion 46. The construction of connecting mechanisms 52, 54, and 62 will be described in greater detail below in the sections referencing FIGS. 5-18.

With additional reference now to FIG. 3, the first window frame 38 is seen in an enlarged view with adjacent portions of the circumferential and longitudinal straps 14, 16. The straps 14, 16 are shown as they would be configured when the module 10 (FIG. 1) is in a non-inflated mode, e.g., during an assembly operation. In the present embodiment, they are interwoven to form a webbing, as seen in FIG. 3. The circumferential straps 14 thus extend perpendicularly outwardly, in mutually parallel alignment, from the adjacent frame end portions 40, 42 to which they are connected, and the longitudinal straps 16 extend perpendicularly outwardly, in mutually parallel alignment, from the respective frame side portions 44, 46 to which they are respectively connected, and perpendicularly of the circumferential straps 14. As may be seen in FIG. 3, the circumferential straps 14 are in substantially contiguous, side-by-side orientation, whereas the longitudinal straps 16 are mutually spaced, a feature that provides important structural benefits, as will be understood from the description to follow.

Preferably, additional, supplementary straps 72, 74 are provided, respectively extending alongside the side portions 44, 46 and end portions 40, 42 of the frame 38, supplementary straps 72 and 74 being connected by stitching 67 to adjacent upper portions of longitudinal and circumferential straps 16, 14 adjacent the frame 38 for maintaining straps 16, 14 in parallel alignment and for limiting access by flexible portions of the module flexible wall to connecting mechanisms 52 and 54. Supplementary straps 72 extend circumferentially, and supplementary straps 74 extend longitudinally of the module 10, FIG. 1. The structure and attachment of the supplementary straps 72, 74 will be described in greater detail in a later section with reference to FIGS. 16-18.

With reference now to FIG. 4, a diagrammatic representation is made of portions of the flexible, multi-layer outer shell or wall structure 68 of the inflatable module 10 (FIG. 1) shown in association with window frame assembly 26 and window frame 38. The construction of such flexible multi-layer wall structures 68 and their integration into an inflatable space module is disclosed in U.S. Pat. Nos. 6,231,010 and 6,547,189, previously incorporated by reference. Accordingly, FIG. 4 is not a comprehensive representation of the construction of such a flexible wall structure 68, but rather, a partially diagrammatic representation of portions of such a wall structure, with the window frame assembly 26, for illustrating the relative orientation of the window frame assembly 26, frame 38, and adjacent layers. For example, the outer, multi-layer M/MOD structure and other components normally present in such wall structures have been omitted for clarity. In the present embodiment and as viewed in FIG. 4, progressing outwardly from the innermost to the outermost layer (progressing upwardly as viewed in the drawing), an inner bladder attachment frame 69*a*, flexible bladder 69*b*, outer bladder attachment frame 69*c*, and bladder protective layer 69*d*, suitable a felt layer, are oriented beneath the frame 38 of first window frame assembly 26. Each of the layers 69*a*, 69*b*, 69*c*, and 69*d* has a respective rectangular opening 31*a*, 31*b*, 31*c*, and 31*d* formed therethrough.

When assembled and integrated with the window frame 38, layers 69*a*, 69*b*, 69*c*, and 69*d* and the window frame 38 are sandwiched together in mutually parallel, contiguous alignment, and the rectangular openings 31*a*, 31*b*, 31*c*, and 31*d* of layers 69*a*, 69*b*, 69*c* are aligned in register with each other and with the peripheral portions the window frame 38, as will be described in greater detail below with reference to FIGS. 16, 17, and 18. The restraint layer straps 14 and 16 are omitted from FIG. 4 for clarity but will be understood to extend outwardly from the frame 38 and adjacent the bladder protective layer 69*d*. As seen in FIG. 4, the layers 69*a*, 69*b*, 69*c*, and 69*d* are convexly curved along their lengths, i.e., convexly curved along the length of the frame 38, to conform with the semi-cylindrical configuration of the window frame assembly 26 and frame 38. The bladder 69*b* is thus sandwiched between attachment frames 69*a* and 69*c* and sealed to the window frame 39 by suitable sealing means, such as an O-ring, not shown.

The construction of the present embodiment of the window frame 38 and connecting means 50, including connecting mechanism arrays 60 and 64, will now be described in greater detail with reference to FIGS. 5-15. With initial reference to FIG. 5, the frame 38 and associated components are shown as viewed from outside the module 10 (FIG. 1), i.e., looking inwardly. For clarity, portions of the straps are omitted for clarity. For example, those adjacent three of the four corners of frame 38, and supplementary straps 72, 74 (FIG. 3) are omitted. As summarized above with reference to FIGS. 2A, 2B, and 3, circumferential straps 14 are connected to the end portions 40, 42 of the window frame 38 by outer connecting mechanisms 52 and inner connecting mechanisms 54 (seen most clearly in FIG. 2B) mounted on frame end portions 40 and 42 and forming staggered arrays 60 of connecting mechanisms extending along the lengths of end portions 40, 42. As also seen in FIG. 5, longitudinal straps 16 are connected to the side portions 44, 46 of the window frame 38 by the mutually aligned, contiguous connecting mechanisms 62 mounted on the respective window frame side portions 44, 46. As may be seen in FIG. 5, the longitudinal straps 16 engaged with and supported by respective inner or contiguous connecting mechanism 54 are mutually parallel and laterally spaced from one another, as indicated at gap 70, whereas the circumferential straps 14, also mutually parallel, are preferably in side-by-side, substantially contiguous array.

With additional reference to FIG. 6, whereas, as previously noted, the window frame 38 is of convex curvature in side elevation matching the cylindrical curvature of the restraint layer body portion 17 (FIG. 1), the oval window seat 48 need not be configured to correspond with the configuration of the restraint layer and is thus rectangular in side elevation. As seen in FIG. 6, the outer surface 49*a* of frame 38 is convex, along the length of frame 38. The inner surface 49*b* is concave and continues the curvature of circumferentially extending straps 14. Loops 39 are formed in the ends of the respective circumferential and longitudinal straps 14, 18 at their juncture with the frame 38 for facilitating connection of the straps to the frame and also extend along the circumferential path. As disclosed in the referenced '010 and '189 patents, the use of such looped end portions 39 associated with respective rollers prevents binding or the like at the connection of the respective straps 14, 16 with the frame 38.

An embodiment of the integrated assembly 51 of connecting mechanisms 52, 54 will now be described in greater detail with reference to FIG. 5 and to sectional views of FIGS. 7-10.

Figure 7:
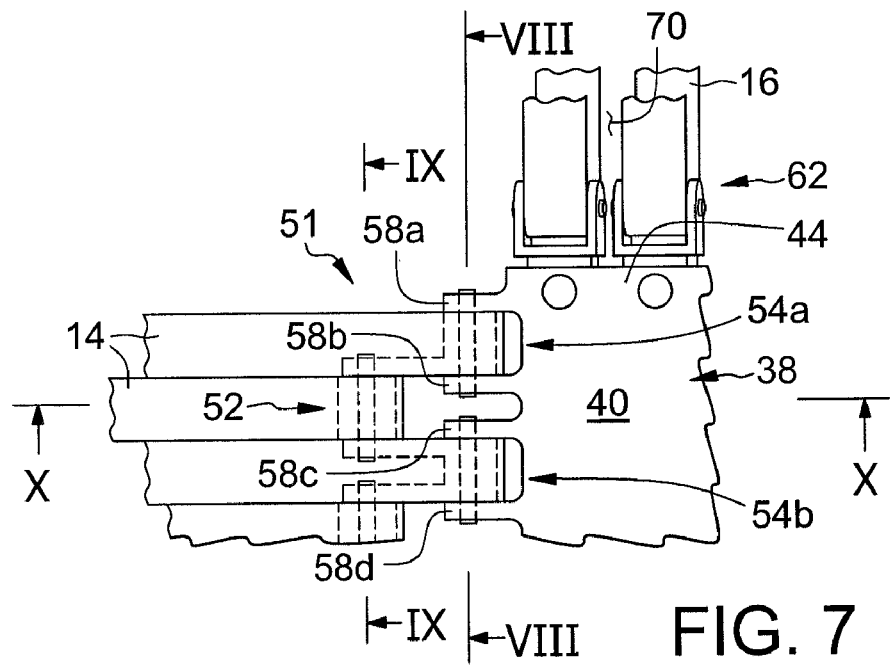
FIG. 7 is a fragmentary, enlarged plan view of the portion of the panel structure and inner and outer connecting mechanisms indicated by broken line VII of FIG. 5.

FIG. 2B is also referenced with respect to the rotatable, integrated assembly 51 and the staggered array 60 of connecting mechanisms 52, 54. Referring now primarily to FIG. 7, an enlarged, fragmentary plan view of the corner section of the frame 38, indicated by broken line VII in FIG. 5, includes details of the connecting mechanisms 52, 54 (54a and 54b as seen in FIG. 7) and their relationship to the frame 38. The region shown in FIG. 7 is thus a portion of the upper left corner of window frame 36 as viewed in FIG. 5. With continued reference to FIG. 7, circumferential straps 14 are connected to outer connecting mechanism 52 and first and second inner connecting mechanisms 54a and 54b. Outer connecting mechanism 52 is thus interleaved, or interposed, between the inner connecting mechanisms 54a and 54b and projects outwardly from the frame end portion 40 beyond the inner connecting mechanisms 54a and 54b. Each of the connecting mechanisms 52, 54a, and 54b are thus mounted on the first end portion 40 of the window frame 38, as seen more clearly in FIG. 5.

Figure 8:
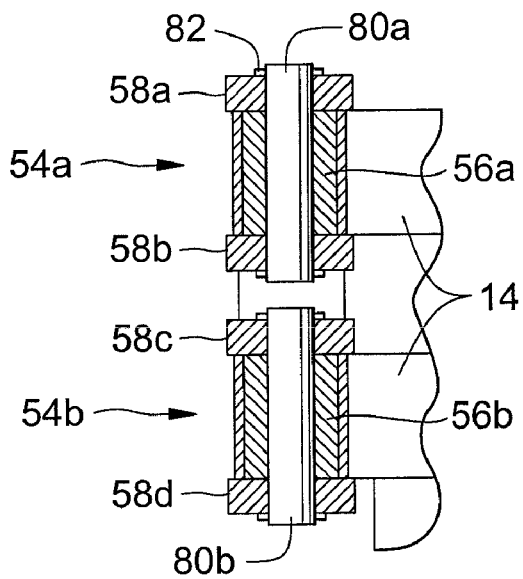
FIG. 8 is a partial, sectional view taken as on line VIII-VIII of FIG. 7.

With additional reference to FIG. 8, first and second, inner connecting mechanisms 54a and 54b include first and second roller structures 56a, and 56b. As seen in FIG. 2B, roller structures 56 are bifurcated, having mutually spaced clevises formed on opposite end portions thereof and extending outwardly therefrom, as will be described below with reference to FIG. 9. Pins 80a and 80b extend coaxially through respective roller structures 56a and 56b, pin 80a being rotatably supported within corresponding bores formed through lugs 58a and 58b (FIGS. 7 and 8), and pin 80b is rotatably supported within corresponding bores formed through lugs 58c and 58d. Suitable locking keys 82 or the like extend laterally through pins 80a and 80b for securing pin 80a engagement with lugs 58a and 58b, and for securing pin 80b in lugs 58c, 58d. As seen more clearly in FIG. 7, lugs 58a, 58b, 58c, and 58d project outwardly from the end portion 40 of frame 38.

As viewed in FIG. 8, circumferential straps 14 engage and extend below the inner roller structures 56a and 56b, since FIG. 8 is a view directed outwardly from the edge of the frame 38, as indicated at VIII-VIII in FIG. 7. That is, circumferential straps 14 are shown extending from the frame 38, and because of the circumferential contour of the restraint layer 12 (FIG. 1), of which the circumferential straps 14 are a part, the straps 14 are shown as extending outwardly and downwardly from the roller structures 56a and 56b (rightwardly as viewed in FIG. 8) showing portions of the inner surface of the restraint layer 12 (FIG. 1), since the straps 14 follow the circumferential curvature of restraint layer 12.

Figure 9:
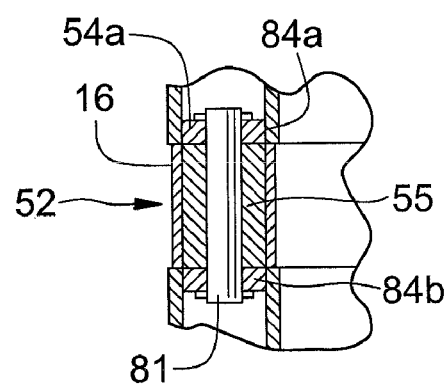
FIG. 9 is a sectional view taken as on line IX-IX of FIG. 7.

With additional reference to FIG. 9, outer connecting mechanism 52 includes outwardly spaced, outboard roller 55 supported by pin 81, which extends coaxially through roller 55. As seen more clearly in FIG. 2B, the outboard rollers 55 are rotatably supported by outwardly extending clevis members 84 of adjacent pairs of (bifurcated) inner roller structures 56. Pins 81 extend between and are rotatably seated within clevis members 84 of adjacent inner roller structures 56. With respect to the particular elements shown in detail in FIGS. 7-10, and with continued reference to FIG. 9, the portion of lug 84a seen in FIG. 9 is the distal end portion of the clevis lug extending from inner roller structure 56a (FIG. 8), and the portion of lug 84b seen in FIG. 9 is thus the distal end portion of the clevis lug extending from inner roller structure 56b (FIG. 8).

Figure 10:
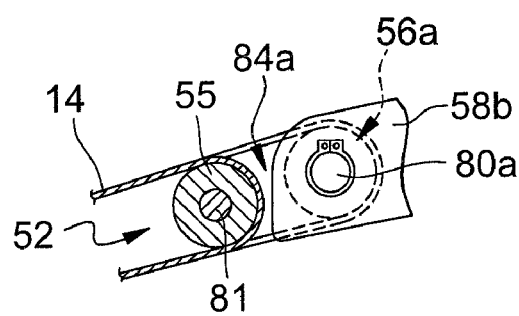
FIG. 10 is a sectional view taken as on line X-X of FIG. 7.

With additional reference to FIG. 10, outer roller structure 52 includes outboard roller 55 mounted on coaxially extending pin 81, seen also in FIG. 9. Pin 81 thus extends between and is rotatably mounted within the lugs 84a and 84b (FIG. 9) integral with and extending outwardly from respective inner roller structures. Inner roller structure 56a and its lug extension 84a are seen in FIG. 10.

With reference now to FIG. 5 and also to FIGS. 2A and 2B, in the present embodiment, a second form of connecting means, termed contiguous connecting mechanisms 62, are mounted on the side portions 44, 46 of frame 38. With reference to FIG. 2B, the contiguous connecting mechanisms 62 thus form a non-staggered, contiguous array 64 of connecting means arrayed along the frame side portions 44, 46. That is, contiguous connecting mechanisms 62 are mounted on frame 38 adjacent and mutually spaced along frame side portions 44 and 46 in lateral alignment with one another rather than being staggered as are connecting mechanisms 52 and 54.

With reference to FIG. 11, a portion of the frame 38 and contiguous connecting mechanisms 62a and 62b are seen in plan. FIG. 11 corresponds to the portion of the structure of FIG. 5 indicated by broken line XI. As seen in FIG. 11, first and second contiguous connecting mechanisms 62a and 62b are mounted on frame 38 adjacent frame side portion 44, the contiguous connecting mechanisms being adjacent to or contiguous with the side portion 44. First and second contiguous connecting mechanisms 62a and 62b include respective devises 86a and 86b extending outwardly from the frame side portion 44.

As may be seen more clearly in FIG. 12, the first and second contiguous connecting mechanisms 62a and 62b include respective rollers 66a and 66b, each roller having a respective roller pin 88a and 88b extending coaxially therethrough. Pin 88a is rotatably received in bores, not shown, formed laterally through clevis lug 90a of first clevis 86a (FIG. 11), and pin 88b is rotatably received in bores formed through clevis lugs 90b of second clevis 86b (FIG. 11). As seen more clearly in FIG. 13, clevis 86b extends outwardly from the frame side portion 44 and supports roller 66b for rotation, with pin 88b, on an axis parallel to the frame end portion 44. Clevis 86b, typical of clevis 86a (FIG. 11), includes an elongated connecting bar 92b, of rectangular cross-section in the present embodiment, projecting inwardly toward the frame side portion 44 and seated within in a corresponding recess 94 formed in the frame side portion 44. A suitable fastening member 96b extends through bores formed through the bar 92b and frame 38 for securing the bar 92b within recess 94, thereby rigidly connecting the clevis 82b and the contiguous connecting mechanism 62b to frame 36.

With reference to FIG. 14, roller 66b is supported by laterally extending pin 88b rotatably seated within lugs 90b of clevis 86b (FIGS. 13, 11), permitting axial rotation of roller 66b. Fastener 96b extends perpendicularly through the frame 38 and clevis connecting bar 92b, seen in FIG. 13.

With primary reference to FIG. 2B, and for reasons previously discussed, the staggered array 60 (FIG. 2B) of connecting means (including inner and outer connecting mechanisms 54 and 52) is preferred for connecting the circumferential straps 14 to the frame end portions 40, 42. As will be more fully discussed, the above-described contiguous, "non-staggered" array of connecting means 64, including contiguous connecting mechanisms 62, are suited for connecting the longitudinal straps 16 to the frame side portions 44, 46, for reasons that will become apparent from the description hereinbelow.

Figure 15:
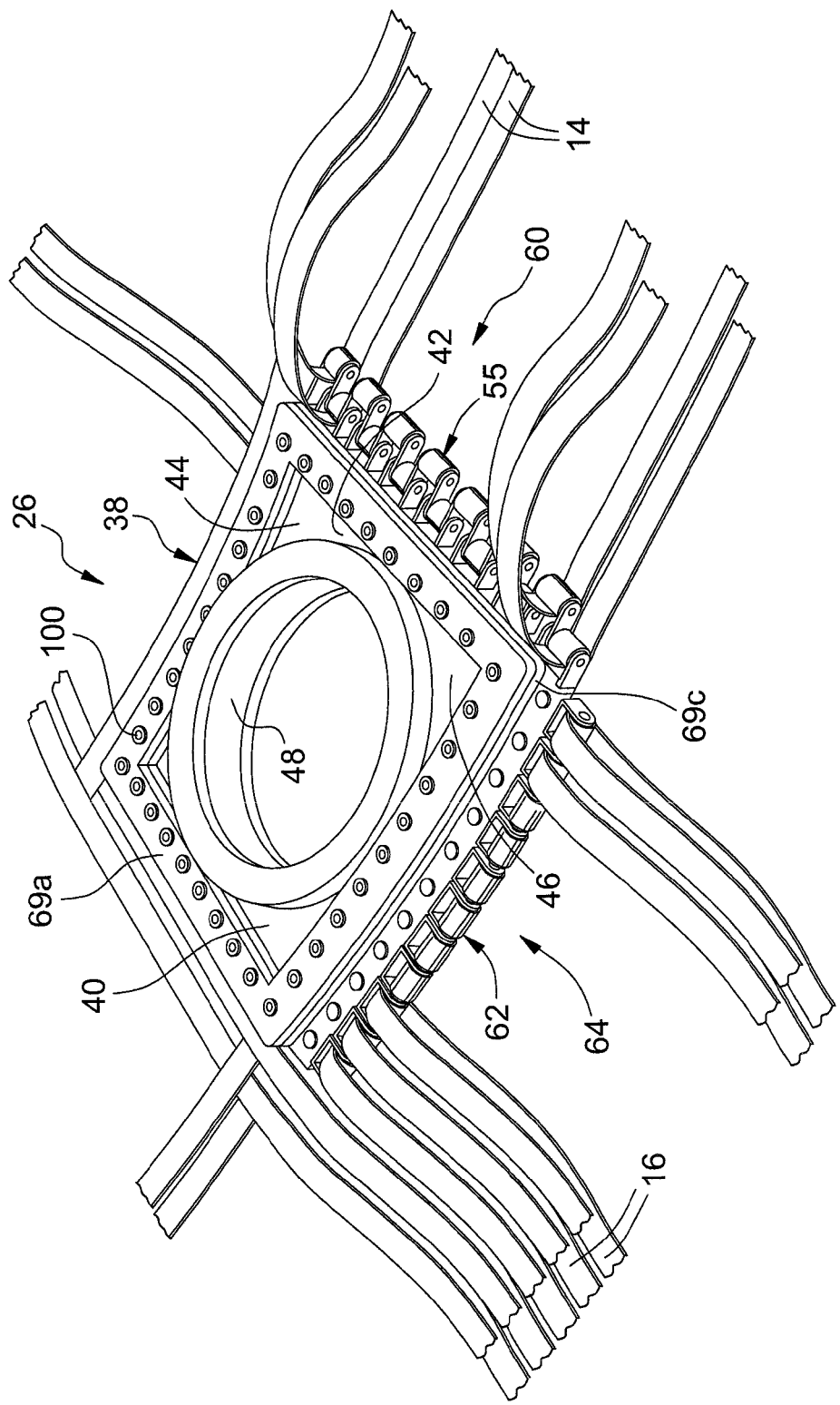
FIG. 15 is an isometric view of the panel in a partially assembled status as viewed from inside the inflatable module and showing several of the load-bearing straps.

With reference now to FIG. 15, the window frame assembly 26 is represented as being viewed from a position inside the inflatable module 10 (FIG. 10), as previously noted, in contrast with the previous figures. The representation of FIG. 15 is a pictorial, perspective representation of the window frame 38, and of several circumferential and longitudinal straps 14, 16 attached thereto, as they would appear during an assembly procedure or the like. As may be seen in FIG. 15, contiguous connecting mechanisms 62 extend in mutual alignment alongside the frame side portion 46, to form contiguous array 64 of connecting mechanisms. Staggered array 60 of connecting mechanisms extends along frame end portion 42. (Connecting mechanisms mounted on frame side portion 44 and end portion 40 being omitted for clarity.) As may also be seen in FIG. 15, inner bladder attachment frame 69a and outer attachment frame 69c are mounted on the inner surface of window frame 38 by bolts or other suitable fastening means 100.

With reference now to FIGS. 16, 17, and 18, the frame 38, portions of the connecting mechanisms 52, 54, and 62, their connection to the straps 14, 16 and supplementary straps 72, 74, and an arrangement of the sandwiched arrangement for sealingly connecting the bladder 69b to the window frame 38, are seen in greater detail. FIG. 16 is a cross-sectional view taken as on a portion of line XVI-XVI of FIG. 5; FIG. 17 is taken as on line XVII-XVII of FIG. 5; and FIG. 18 is taken as on line XVIII-XVIII of FIG. 5. FIGS. 16 and 17 are thus similar to FIGS. 10 and 13, respectively, but are enlarged to show details of the webbing formed by interwoven straps 14, 16, the supplementary straps 72, 74, and details of the bladder connection arrangement.

As seen in both FIGS. 16, and 18, the frame end portion 40 and associated inner and outer connecting mechanisms 52 and 54 extend laterally outwardly from the frame 38 and are also canted inwardly, or downwardly as viewed in the drawing, following the circumferential curvature of the module 10 (FIG. 1), thereby avoiding any substantial discontinuity or deviation from the cylindrical contour of the module elongated body 17 (FIG. 1). In FIGS. 16 and 18, one of the circumferential straps 14, terminating in one of loops 39, is seen extending outwardly from the frame 38 and connecting mechanisms 54, 52 and extending along the cylindrical contour of the frame 38, as seen more clearly in FIG. 6. It thus continues the inwardly curved contour of the module outer wall structure and the frame 38. The portion of the circumferential strap 14 seen in FIGS. 16 and 18 constitutes one of the looped end portions 39. Several of the longitudinal straps 16, shown in cross-section in FIGS. 16 and 18, are interwoven with the circumferential straps 14. Additionally, several of the longitudinally extending supplementary straps 74 are seen as interwoven with the upper portion of loop 39, stitched thereto as seen in FIG. 3, for keeping straps 14 and attached loops 39 in alignment, and for isolating connecting mechanisms 52, 54 from flexible layers, not shown, of wall structure 12 (FIG. 1).

The flexible bladder 69b is positioned inwardly (below, as viewed in the drawing) of the restraint layer webbing formed by straps 14, 16 and is sealingly connected to the inner surface of frame end portion 40, as will now be described. Starting from the frame 38 and progressing inwardly (downwardly as viewed in FIGS. 16 and 18), outer bladder attachment frame 69c, bladder 69b, and inner bladder attachment frame 69a are sandwiched together and maintained in sealing relation to the inner surface of frame 38 by suitable fastening means 100, the inner bladder connecting frame 69a and fastening means 100 being shown in greater detail in FIG. 15. A layer 69d, suitably of a relatively stiff felt material, is fastened over the bladder 69b adjacent the connecting mechanisms 54, 52 for protecting the bladder from possible protrusion into gaps formed between the connecting mechanisms 54, 52.

With additional reference to FIG. 17, one of the longitudinal straps 16, terminating in one of the loops 39, is seen extending laterally or outwardly from the frame side portion 44, and several longitudinal straps 14, interwoven with the longitudinal straps, are seen in cross-section. In contrast to the structure shown in FIGS. 16 and 18, the longitudinal strap 16, associated connecting mechanism 62, and frame side portion 44 are not inwardly canted, but rather, extend linearly outwardly from the frame side portion 44 along a common plane, thereby avoiding substantial discontinuities between the roller mechanisms 62, the straps 16, and the side portion 44 of the module body 17 (FIG. 1). That is, the straps 16 and frame 38 extend substantially linearly along the frame inner surface, or parallel to the wall structure of module 10, FIG. 1, in the longitudinal direction.

The inner and outer connecting mechanisms 54, 52, as seen in FIGS. 16 and 18 were described with reference to FIGS. 2B and 5-10. Inner, bifurcated roller structure 56 of inner connecting mechanism 54 is rotatably mounted on frame end portion 40. Outer roller 55 (FIG. 16), of outer connecting mechanism 52, is axially rotatable with pin 81, which is rotatably mounted in clevis 84 (FIGS. 2B, 18) formed integrally with bifurcated inner roller structure 56. As seen most clearly in FIG. 18, clevis 84 rotatably supports pin 81 and outer roller 55 (FIG. 16). The circumferential strap 14 seen in FIG. 18 is looped around the inner curved surface of inner roller structure 56, whereas in the section shown in FIG. 16, a circumferential strap 14 is shown looped around the outer roller 55, a second circumferential strap, shown in broken lines, being seen behind strap 14 as viewed in the drawing, looped around inner roller structure 56.

With respect to the contiguous connecting mechanism 62, as seen in FIG. 17, roller 66 is seen supporting the looped end portion 39 of longitudinal strap 16, roller 66 and shaft 88 being rotatably supported by clevis 86.

As also seen in FIG. 17, the clevis 86, roller 66, and longitudinal strap 16 are each supported by the inwardly projecting clevis bar 92. Accordingly, and as will be understood by those in the art, in structures other those of the present embodiment, non-axial forces could, in some circumstances, be applied to structures such as the bar 92. That is, although after inflation of the module, tensional forces on the straps 14, 16 and those applied by the straps to the clevis bar 92 are normally axial, exerted along the length of the straps and the length of the bar 92, in circumstances such as those experienced during the inflation process in which the module flexible wall structure is unfolded and expanded, non-axial forces may be applied, and the bar could thus act as a lever, multiplying such forces, with potentially deleterious effects on the clevis or window frame 38. In contrast, the integrated, staggered, dual roller assembly 51 of FIGS. 16 and 18 does not entail such potentially deleterious effects because the entire, integrated roller assembly 51 is rotatable in either rotational direction, and because no elongated bar structure, such as 92, FIG. 17, is employed. Accordingly for applications in which greater tensional forces may be present, the staggered connecting means array 60 (FIG. 2B), incorporating integrated roller assembly 51 (FIGS. 16 and 18) can be advantageous.

The above-discussed arrangements for connecting the straps, connecting mechanisms, bladder, and protective felt layer thus provide a smooth transition of the restraint layer 12 and bladder 69b into the frame 38. With respect to the straps 14 and 16 that are connected to the frame 38, the supplemental straps 72, 74 crossing them are woven on one of the adjacent loops 39 of the straps 14 and 16, securing the straps adjacent the frame 38. The felt buffer 69b provides a smooth backing near the frame-bladder interface covering any gaps that may exist near the interface to prohibit the bladder from bulging through these gaps. The felt buffer also serves to position the straps that pass under the rigid frame, as they are indexed to it.

Figure 19:
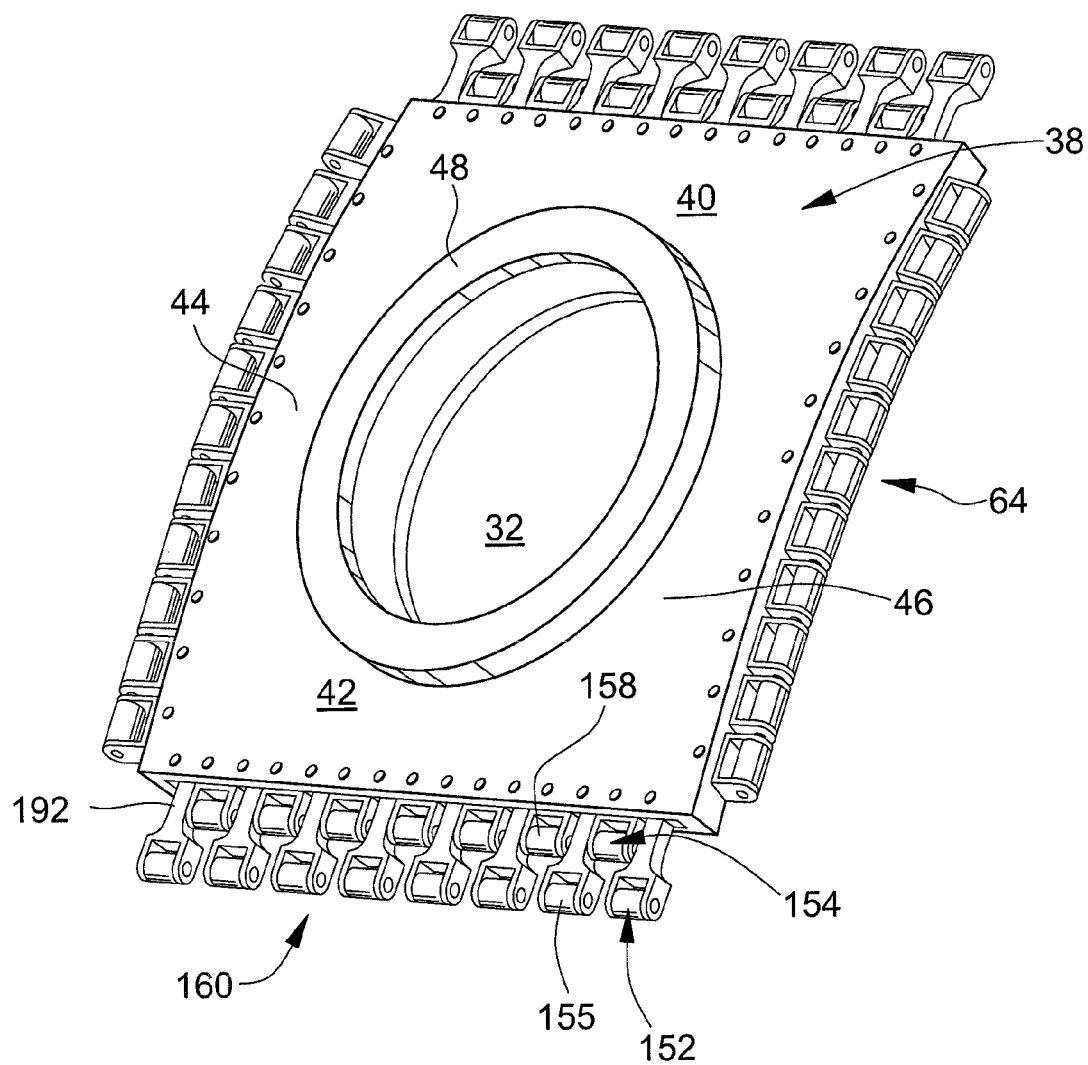
FIG. 19 is an isometric representation similar to FIG. 2A of the panel structure showing a second embodiment of the staggered array of connecting mechanisms.

With reference now to FIG. 19, the window frame 38 is seen having a second embodiment of staggered connecting means 160. The second embodiment of staggered connecting means 160 differs from the embodiment 60 seen, for example, in FIGS. 2A and 2B, in that it does not include a rotatable, integrated assembly 51 of connecting mechanisms, such as that seen in FIG. 2B and related figures. Instead, in the embodiment of FIG. 19, the staggered array of connecting means 160 incorporate inner, contiguous connecting mechanisms 154 and outer connecting mechanisms 152, each of which are individually mounted on frame end portions 40, 42 by devises supported on outwardly extending elongated shafts 192. Accordingly the construction of the connecting mechanisms 152, 154 of the second embodiment shown in FIG. 19 will be seen as similar to that previously described with respect to the contiguous connecting mechanisms 62, FIG. 2B, which also are mounted on side portions 44, 46 of the frame 38 as in the previously described embodiment. The connecting mechanisms 152, 154 each include a respective roller 156, 158, each of the rollers 158 of inner connecting mechanisms 154 being axially aligned, and each of the outer rollers 156, of outer connecting mechanisms 152, being axially aligned along an axis spaced outwardly from the frame 38 and the inner, contiguous connecting mechanisms 154. Thus, as in the first embodiment incorporating integrated assembly 51 (FIG. 2B), the embodiment of FIG. 19 includes inner and outer connecting mechanisms (154 and 152) mounted on the frame structure 38 and spaced along the structure peripheral end portions in an interleafed array in which respective outer connecting mechanisms 152 are interposed between adjacent pairs of inner connecting mechanisms 154, the outer connecting mechanisms projecting outwardly from the peripheral edge portion of the frame structure beyond the adjacent inner connecting mechanisms 154 and thereby forming a staggered array of connecting mechanisms extending along the panel structure end portions.

Thus, the present invention provides an improved means for integrating rigid structures into the flexible wall structure of an inflatable structure and providing an efficient and relatively low-stress interface between the rigid and non-rigid components. Issues of particular concern with respect to the construction of such modules and their safety and reliability over time, including problems relating to the integration and interaction of the rigid and flexible components, are substantially alleviated by the disclosed structures. Such constructional issues include the necessity of preventing damage to the flexible layers incorporated in the flexible shell of such modules, such as the bladder, restraint layer, and protective backing materials, as the module is unfolded and expanded during its inflation and deployment. Also, the structure of the present invention accommodates the differential stresses and differing reaction to stresses by rigid and flexible components experienced during and after deployment, as the flexible outer shell is expanded.

As disclosed, means are provided for reducing potentially damaging, differential stresses on the respective flexible straps, for ensuring that such forces are evenly distributed, and for accommodating the differing reactions to stress of the rigid and flexible components. For example, such differential stresses are accommodated by the use of connecting mechanisms particularly adapted for connecting the mutually parallel circumferential and mutually parallel longitudinal webbing straps to one or more rigid panel members, such as window frames, such that tensional loads are equally distributed thereon; such that the loads are parallel to the major axes of the panel; and such that bending moments on elements on the panel are reduced. Non-axial stress on the connecting mechanisms, such as the lever effect that could be associated with elongated members supporting roller-bearing devises as previously discussed, are reduced, particularly with respect to the first embodiment incorporating a rotatable, integrated assembly.

With respect to the need to accommodate and equally distribute the loads, it has been noted that, upon inflation, the flexible components of the module 10 (FIG. 1), such as restraint layer 12, tend to stretch or elongate when they sustain tensional loads, whereas rigid elements, such as frame structure 38, do not flex or elongate to any significant degree. The elongation of the flexible and rigid structures may be sufficiently different that an uneven load distribution could result around a respective window frame. As previously noted, if unaddressed, this local effect could overload the restraint layer 12 and/or frame in that region, for example, overloading the strips connected to portions of the frame, and placing undesired strain on the frame itself. Accordingly, the straps connected to the rigid frame may be oversized by an amount sufficient to accommodate the substantial lack of elongation over the length or width of the frame. This may be accomplished empirically by noting the elongation per unit length along the longitudinal and circumferential straps 16, 14 as they are subjected to the tension experienced during the inflation process and during subsequent use over time, and lengthening the straps connected to the frame 38 by an equivalent amount. It should be further noted that, since the circumferential and longitudinal straps may be under different degrees of strain, the compensating elongation of each may be different. It should also be noted that, because of the above-discussed advantages provided by the staggered array of connecting means comprising inner and outer connecting mechanisms, for example, the ability to accommodate greater numbers of circumferential straps per unit of length along the frame end portions 40, 42 and with the staggered array of connecting means, the rotation of the integrated assembly 51 (FIG. 2B) of inner and outer connecting mechanisms 54, 52 is effective to follow the contour of the straps and reduce lateral strain. Thus, the difficulties of accommodating the differential elongation of rigid and non-rigid components are reduced.

As will now be understood, the circumferential straps 14 may be positioned in mutually adjacent, mutually contiguous alignment rather than mutually spaced alignment because the staggered array 60 of connecting mechanisms 52, 54, and, in the second embodiment, the staggered array 160 of connecting mechanisms 152 and 154 permit closer spacing of the straps 14. As noted above, this is because the inner connecting mechanisms are positioned behind the outer connecting mechanisms and may therefore extend laterally on either side of the outer connecting mechanisms, permitting their respective rollers to be spaced closer together along the frame end portions 40, 42.

As discussed in previous sections, tension applied along straps extending circumferentially around the cylindrical, longitudinally extending inflatable module body is normally greater than that applied along straps extending longitudinally, along the length of the elongated body. Accordingly, in some applications, if the loads are to be evenly distributed, it is advantageous to use a greater number of circumferential straps than longitudinal straps. As will now be understood, embodiments of the present invention permit closer spacing of adjacent straps. Thus, as previously noted, the circumferential straps connected to respective end portions of the rigid panel may be substantially contiguous with one another, rather than mutually spaced. If desired, they may be positioned closer to one another than the longitudinal straps, connected to side portions of the panel. Thus, by reducing the strain sustained by respective circumferential straps, the loading of the circumferential and longitudinal straps may be substantially equalized. As will now be understood from the above description and accompanying drawings, the present invention thus substantially alleviates such problems, permitting closer spacing of the clevis/roller connecting mechanisms and the straps, as previously discussed, along the end portions of the window frame. The differential between the loads sustained by the circumferential and longitudinal load-bearing straps may therefore be substantially reduced Further, the connecting mechanisms of the above-described embodiments minimize the distance between inflatable and rigid components, reducing the number of unattached restraint layer straps. Further, because of the closely adjacent positioning of the restraint layer to the frame and the use of the protective felt layer, gaps at this interface, which could allow the bladder of an inflatable module to protrude with the possibility of catastrophic failure, are reduced. Overall, relatively few parts are necessary, and simplification is achieved.

Although particular embodiments of the invention have been described in the foregoing description and illustrated in the accompanying drawing, various improvements, modifications, and alternative applications and uses will be readily apparent to those of ordinary skill in the art. For example, although the illustrated embodiments have related to applications with a module intended for use in exoatmospheric space, the invention also has other applications such as applications in structures intended for use in marine and terrestrial environments, as previously discussed. Accordingly, the scope of the present invention should be considered in terms of the following claims, and it is not to be limited to the details of the embodiments and operation described in this specification and shown in the drawings.

What is claimed is:

1. For an inflatable structure having a flexible outer shell including a restraint layer comprising a plurality of circumferential and longitudinal flexible straps and at least one opening formed therethrough, wherein the circumferential and longitudinal flexible straps have respective end portions adjacent to the at least one opening; and at least one substantially rigid structure wherein each of the at least one opening is formed to receive one of the at least one substantially rigid structure, wherein each substantially rigid structure has at least one peripheral edge portion and is comprised of:

a first connecting means for receiving respective ones of predefined circumferential straps and connecting them to the substantially rigid structure, the first connecting means comprising inner connecting mechanisms and outer connecting mechanisms, the inner and outer connecting mechanisms being mounted on the substantially rigid structure and spaced along at least one of the substantially rigid structure's at least one peripheral edge portion in an interleafed array in which respective outer connecting mechanisms are interposed between adjacent pairs of inner connecting mechanisms, the outer connecting mechanisms projecting outwardly from the at least one peripheral edge portion of the substantially rigid structure beyond the adjacent inner connecting mechanisms to form a staggered array of inner and outer connecting mechanisms extending along the substantially rigid structure at least one peripheral edge portion.

2. The substantially rigid structure of claim 1, the first connecting means further comprising means for restraining the predefined circumferential straps in mutually parallel and substantially contiguous alignment.

3. The substantially rigid structure of claim 1 wherein the substantially rigid structure is of substantially rectangular configuration having:
   first and second end portions;
   first and second side portions;
   first and second peripheral edge portions extending along the first and second end portions, respective; and
   third and fourth peripheral edge portions extending along the first and second side portions, respectively,
   wherein the first connecting means being mounted adjacent the first and second end portions, and
   wherein the inner and outer connecting mechanisms are spaced along the first and second peripheral edge portions.

4. The substantially rigid structure of claim 1, wherein the connecting mechanisms each comprise a roller for receiving a respective one of the predefined circumferential straps, the rollers of the outer connecting mechanisms being spaced outwardly from the adjacent substantially structure peripheral edge portion beyond the rollers of the inner connecting mechanisms.

5. The substantially rigid structure of claim 4, the inner and outer connecting mechanisms further comprising respective inner and outer support structures for rotatably receiving respective ones of the rollers of the inner and outer connecting mechanisms, the inner and outer support structures receiving the rollers of the inner connecting mechanisms and the rollers of the outer connecting mechanisms, respectively, in an overlapping manner along the substantially rigid structure peripheral edge portion.

6. The substantially rigid structure of claim 2, the substantially rigid structure further comprising a second connecting means being mounted on the third and fourth peripheral edge portions, wherein the second connecting means are comprised of respective pluralities of linear, non-staggered connecting mechanisms mutually spaced along the third and fourth peripheral edge portions in a contiguous array, and wherein the second connecting means receive ones of predefined longitudinal straps and connecting them to the substantially rigid structure.

7. The substantially rigid structure of claim 1, wherein the inner and outer connecting mechanisms comprise an integrated assembly rotatably mounted on the substantially rigid structure.

8. The substantially rigid structure of claim 7, the integrated assembly being mounted adjacent the substantially rigid structure at least one peripheral edge portion for rotation about an axis substantially parallel to the substantially rigid structure at least one peripheral edge portion.

9. For an inflatable space module having an elongated body of generally cylindrical configuration and having a flexible outer shell including a restraint layer comprising webbing formed of a plurality of flexible circumferential and longitudinal reinforcing straps, the restraint layer having an opening formed therethrough for receiving a substantially rigid structure, the substantially rigid structure comprising:

a panel positioned within and in register with the opening, the panel having first and second end portions and first and second side portions, the panel structure being curved along its length in a semi-cylindrical configuration substantially corresponding to the configuration of the space module cylindrical body, the panel first and second end portions extending substantially parallel to the longitudinal axis of the module body;

a plurality of connecting means mounted on the panel first and second end portions for receiving respective ones of predefined circumferential straps and connecting them to the panel, the connecting means comprising outer connecting mechanisms and inner connecting mechanisms, the outer mechanisms being positioned between adjacent pairs of inner connecting mechanisms and spaced outwardly from the panel beyond the adjacent inner connecting mechanisms to form a staggered array of connecting mechanisms along the panel first and second end portions the connecting mechanisms comprising means for restraining the straps in mutually parallel and substantially contiguous alignment.

10. For an inflatable space module having a flexible wall structure, the space module being of elongated, substantially cylindrical configuration when in a deployed, inflated mode, the flexible wall structure having a restraint layer comprising a webbing of circumferentially extending and longitudinally extending straps, a window structure adapted to be mounted in an opening formed through the wall structure, comprising:

a substantially rigid panel, having a window mounted therein, the panel having first and second end portions extending substantially parallel to the longitudinal axis of the restraint layer and first and second side portions extending substantially perpendicular to the end portions;

an integrated assembly of first connecting mechanisms, the integrated assembly being rotatably mounted on the panel for rotation about an axis extending along one of the panel end portions, each integrated assembly comprising inner connecting mechanisms and outer connecting mechanisms, the inner and outer connecting mechanisms being spaced along the respective panel end portion in an interleaved array in which respective outer connecting mechanisms are interposed between adjacent pairs of inner connecting mechanisms, the outer connecting mechanisms projecting outwardly from the respective end portion of the panel beyond the adjacent inner connecting mechanisms to form a staggered array of first connecting mechanisms extending along the respective panel end portion, the inner and outer connecting mechanisms comprising means for receiving respective ones of the circumferentially extending straps.

11. The window structure of claim 10, the inner and outer connecting mechanisms comprising means for retaining the circumferentially extending straps in mutually parallel and mutually contiguous alignment.

12. The window structure of claim 10, further comprising a plurality of linear, non-staggered contiguous second connecting mechanisms mounted on the panel adjacent one of the first and second side portions in an array extending along the one of the first and second side portions, the contiguous connecting mechanisms comprising means for receiving respective ones of the longitudinally extending straps and connecting the longitudinally extending straps to the panel.

13. The window structure of claim 12, the contiguous connecting mechanisms further comprising means for retaining the longitudinally extending straps in mutually parallel and mutually spaced alignment.

14. The window structure of claim 12, further comprising a plurality of supplementary straps, extending alongside the panel and attached to at least some of the circumferentially extending and longitudinally extending straps, the supplementary straps comprising means for maintaining the circumferentially ex longitudinally extending straps in a predefined configuration.

15. The window structure of claim 12, the flexible wall structure including a bladder, further comprising a layer of material positioned between the bladder and the first and second connecting mechanisms.

16. The window structure of claim 15, wherein the layer of material comprises means for preventing protrusion of portions of the bladder into contact with the first and second connecting mechanisms.

17. The window structure of claim 12, the layer of material comprising a layer of felt.

* * * * *